US011976794B2

(12) United States Patent
Hall et al.

(10) Patent No.: US 11,976,794 B2
(45) Date of Patent: May 7, 2024

(54) SYSTEMS AND METHODS FOR PROVIDING A SHOW EFFECT FOR AN ATTRACTION SYSTEM

(71) Applicant: Universal City Studios LLC, Universal City, CA (US)

(72) Inventors: Gregory Shellman Hall, Orlando, FL (US); Dante Lamar Bruno, Orlando, FL (US); Matthew Robert Rossett, Orlando, FL (US); Rachel Nicole Migliacci, Windermere, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/585,236

(22) Filed: Jan. 26, 2022

(65) Prior Publication Data

US 2023/0235864 A1 Jul. 27, 2023

(51) Int. Cl.

*F21S 2/00* (2016.01)
*F21S 4/26* (2016.01)
*F21V 3/04* (2018.01)
*F21V 21/005* (2006.01)
*F21W 131/40* (2006.01)

(52) U.S. Cl.

CPC . *F21S 4/26* (2016.01); *F21S 2/00* (2013.01); *F21V 3/049* (2013.01); *F21V 21/005* (2013.01); *F21W 2131/40* (2013.01)

(58) Field of Classification Search

CPC .... A47C 7/725; A47C 7/72; F21S 4/28; F21S 4/22; F21S 4/00; F21S 8/00; F21S 41/18; F21S 4/26; F21S 2/00; F21S 4/20; F21V 23/02; F21V 21/0808; F21V 19/00; F21V 23/00; F21V 29/15; F21V 3/049; F21V 21/005; F21V 23/0435; F21Y 2113/10; F21Y 2115/10; F21Y 2113/20; G02B 6/00; F21L 4/025; F21L 14/023; F21L 27/00; F21W 2131/40; H05B 35/00; A63G 31/00

See application file for complete search history.

(56) References Cited

U.S. PATENT DOCUMENTS 6,527,412 B2 3/2003 Ko
8,241,133 B1 * 8/2012 Lewis .................... A63G 31/16 104/53
8,651,691 B2 2/2014 Grajcar
(Continued)

FOREIGN PATENT DOCUMENTS

CN 103236483 A 8/2013
CN 205191476 U * 4/2016 ......... F41H 13/0087
(Continued)

OTHER PUBLICATIONS

English Translation of CN-205191476-U; Huang X (Year: 2014).*
(Continued)

*Primary Examiner* — Zheng Song
*Assistant Examiner* — Glenn D. Zimmerman
(74) *Attorney, Agent, or Firm* — Fletcher Yoder, P.C.

(57) ABSTRACT

A show effect system may include a plasma tube configured to generate an electric arc within the plasma tube and a light strip extending along the plasma tube. The light strip may include a plurality of light emitters configured to output light through the plasma tube and backlight the electric arc generated by the plasma tube.

21 Claims, 5 Drawing Sheets

(56) References Cited

U.S. PATENT DOCUMENTS

| | | | | |
|---|---|---|---|---|
| 2008/0106512 | A1 | 5/2008 | Schwab | |
| 2010/0110682 | A1 | 5/2010 | Jung et al. | |
| 2014/0268771 | A1* | 9/2014 | Heikman | F21V 29/506<br>362/249.02 |
| 2015/0257224 | A1* | 9/2015 | Timm | F21K 9/20<br>315/77 |
| 2018/0284881 | A1* | 10/2018 | Briggs | A63G 33/00 |
| 2019/0288144 | A1 | 9/2019 | Coulot et al. | |
| 2020/0223360 | A1 | 7/2020 | Bruno et al. | |
| 2020/0300427 | A1* | 9/2020 | Jiang | F21V 3/062 |

FOREIGN PATENT DOCUMENTS

| | | | | |
|---|---|---|---|---|
| WO | 2013120892 | A2 | 8/2013 | |
| WO | WO-2021094666 | A1 * | 5/2021 | H05B 41/34 |

OTHER PUBLICATIONS

Webpage—https://aworkstation.com/neon-and-glass-artworks-glow-in-surreal-art-of-plasma-exhibition/ ;Neon and Glass Artworks Glow in Surreal ‘Art of Plasma’ Exhibition; (Year: 2017).*

Phantom Dynamics, Innovations of Light, Sound, and Imagination, Plasma Glass Electric Displays, Mar. 20, 2007, pp. 1-4, https://phantomdynamics.com/special-effect-lighting/plasma-glass/.

Robert Iannini, Tesla Universe, Electronic Tornado—Plasma Display Power Supply, Jan. 31, 2020, Radio Electronics, pp. 43-48, 82, https://teslauniverse.com/build/plans/electronic-tornado-plasma-display-power-supply.

PCT/US2023/011548 International Search Report and Written Opinion mailed May 30, 2023.

* cited by examiner

SYSTEMS AND METHODS FOR PROVIDING A SHOW EFFECT FOR AN ATTRACTION SYSTEM

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction. Immersive environments may include three-dimensional (3D) props and set pieces, robotic or mechanical elements, electrical or chemical elements, and/or display surfaces that present media. For example, an immersive environment may be provided via show components that operate to produce a light show effect that has the appearance of a visual electrical effect (e.g., electrical arcing or plasma generation). However, it is now recognized that current approaches to emulating the appearance and/or aesthetic of visual electrical effects are limited. Thus, improvements for replicating the appearance of visual electrical effects are desired to provide a more realistic, suitable, and/or desirable interactive experience.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a show effect system includes a plasma tube configured to generate an electric arc within the plasma tube and a light strip extending along the plasma tube. The light strip comprises a plurality of light emitters configured to output light through the plasma tube and backlight the electric arc generated by the plasma tube.

In an embodiment, an attraction system includes a plasma tube configured to generate an electric arc within the plasma tube, a light strip extending along the plasma tube, and a vehicle configured to move along a path proximate to at least a portion of the plasma tube and the light strip. The light strip is configured to output light through the plasma tube and onto the electric arc generated by the plasma tube.

In an embodiment, a show effect system includes a plasma tube comprising a switch configured to apply a voltage to generate an electric arc within an internal volume of the plasma tube and a light strip configured to output a light. The light strip is oriented to output the light through the plasma tube and onto the electric arc generated within the internal volume of the plasma tube. The show effect system may include a controller communicatively coupled to the plasma tube and the light strip. The controller is configured to perform operations including instructing the switch to apply the voltage to generate the electric arc and instructing the light strip to output the light.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

When introducing elements of various embodiments of the present disclosure, the articles “a,” “an,” and “the” are intended to mean that there are one or more of the elements. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers’ specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to providing show effects for an amusement or theme park. The amusement park may include a variety of features, such as rides (e.g., a roller coaster), theatrical shows, set designs, performers, and/or decoration elements, to entertain guests. Show effects may be used to supplement or complement the features, such as to provide the guests with a more immersive and/or unique experience. For example, the show effects may be presented to emulate real world elements in order to present a more realistic atmosphere for the guests.

Embodiments of the present disclosure are directed to a show effect system to present electrical, plasma, or lightning effects in a realistic manner. For example, the show effect system may include a plasma tube and a light strip or source extending along the plasma tube. A high voltage may be applied within the plasma tube to generate one or more electric arcs. The light strip may provide a light effect that travels along the plasma tube to portray directionality of the electric arc generation. In this manner, the light effect provided by the light strip may enhance the appearance of the electric arc(s) generated by the plasma tube, such as by providing more lively and/or chaotic electrical elements. As such, the plasma tube and light strip may collectively provide a unique and/or realistic visualization of electrical effects to guests of the amusement park.

Figure 1:
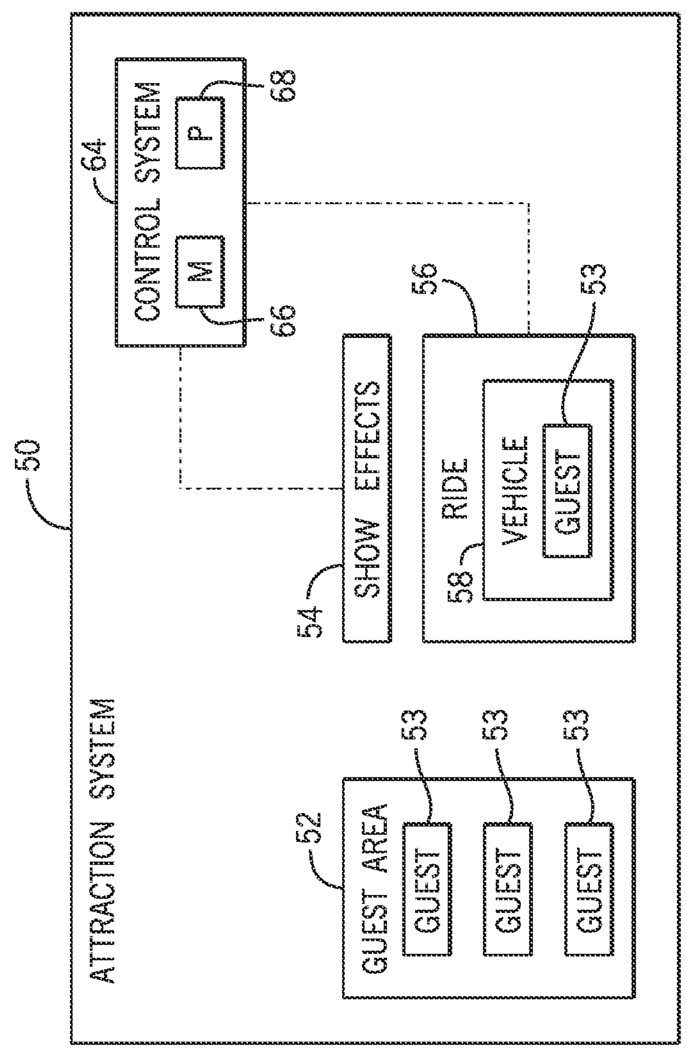
FIG. 1 is a schematic diagram of an embodiment of an attraction system, in accordance with an aspect of the present disclosure.

With the preceding in mind, FIG. 1 is a schematic diagram of an embodiment of an attraction system 50 of an amusement park. For example, the attraction system 50 may include a roller coaster, a motion simulator, a water ride, a walk through attraction (e.g., a maze), and the like. The attraction system 50 may include a guest area 52 where various guests 53 may be located. In an embodiment, the guest area 52 may include an open space, such as a walkable area (e.g., a queue or line) where guests may enter the attraction system 50, exit the attraction system 50, or otherwise navigate through the attraction system 50. The attraction system 50 may also include show effects 54, which may be operated to enhance the guest experience provided by the attraction system 50. For instance, the show effects 54 may include light effects, a movable object (e.g., a robot), smoke effects, audio effects, and the like. Although the show effects 54 are located outside of the guest area 52 in the illustrated attraction system 50, the show effects 54 may be at least partially located within the guest area 52 in an additional or an alternative attraction system 50.

The attraction system 50 may also include a ride 56, which may have a vehicle 58. The ride 56 may, for example, include a roller coaster, a water ride, a motion simulator, a dark ride, and so forth. To this end, the vehicle 58 may move (e.g., translate, rotate, pivot) about a motion base and/or along a track of the attraction system 50 in an embodiment. In an additional or alternative embodiment, the vehicle 58 may remain stationary within the attraction system 50. One or more guests 53 may be positioned within the vehicle 58. As an example, the guest(s) 53 may enter the vehicle 58 from the guest area 52 and/or exit the vehicle 58 to the guest area 52 to move between the guest area 52 and the ride 56. The ride 56 may entertain the guest(s) 53 via movement of the vehicle 58, such as by providing certain movement sensations for the guest(s) 53. Additionally or alternatively, the show effects 54 may entertain the guest(s) 53 positioned in the vehicle 58, such as by providing realistic visual and/or audio effects. In this manner, the show effects 54 may be controlled to entertain guests 53 in both the guest area 52 and the ride 56.

In an embodiment, the show effects 54 may include combinations of electrical, plasma, and lightning effects. For example, the show effects 54 may include a plasma tube configured to generate one or more electric arc(s) within the plasma tube via a voltage applied to the plasma tube. The show effects 54 may also include a light strip or source that extends along the plasma tube and emits a light toward the plasma tube (e.g., into the plasma tube) in order to illuminate the plasma tube, thus backlighting the electric arc(s) generated within the plasma tube relative to a viewing guest. For example, the light provided by the light strip may enhance the appearance of electric arc(s), such as by adjusting (e.g., augmenting, amplifying) a shape, an intensity, and/or size of the electric arc(s), as perceived by a guest viewer. Thus, the plasma arc and the light strip may operate in conjunction with one another to generate a unique visual electrical effect. As a specific example, light emitters (e.g., light emitting diodes) on the light strip may be arranged in a line and controlled to pulse in series to provide the appearance of linear movement of the associated light in a direction, which when combined with the plasma arcs in the plasma tube creates a visual perception of electrical arcing progressing along the direction. As can be appreciated, other operations and arrangements of light emitters of the light strip may create other perceptions (e.g., color changes, magnitude changes, forking of light as different light emitters are activated/deactivated, and so forth).

The attraction system 50 may also include a control system 64 (e.g., an automated or programmable controller) configured to operate the ride 56 and/or the show effects 54. The control system 64 may include a memory 66 and processing circuitry 68. The memory 66 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50. The processing circuitry 68 may be configured to execute such instructions. For example, the processing circuitry 68 may include one or more application specific integrated circuits (ASICs), one or more field programmable gate arrays (FPGAs), one or more general purpose processors, or any combination thereof.

The control system 64 may be communicatively coupled to the show effects 54 and the ride 56. For instance, the control system 64 may control movement of the vehicle 58 within the attraction system 50 and/or various outputs provided by the show effects 54. In an embodiment, the control system 64 may set, adjust, and/or change one or more parameters of the show effects 54, such as to control the appearance of the visual electrical effect provided by the show effects 54. As an example, the show control system 64 may operate the show effects 54 to cause the visual electrical effect to appear to move or travel in a certain manner relative to the vehicle 58. For instance, the control system 64 may cause the light strip to output light sequentially to light emitters disposed along a length of the light strip to portray movement of light along the light strip and to illuminate different locations along the plasma tube (e.g., backlighting different portions or sections of the electric arc(s) within the plasma tube). Such operation of the light strip in conjunction with provision of the electric arc(s) may depict or be perceived by a viewer as movement or directionality of the electric arc(s) generated within the plasma tube. Indeed, the electric arc(s) may appear to move proximate and/or along the vehicle 58 such that the guest(s) 53 positioned within the vehicle 58 may observe the enhanced electric arc(s) within the plasma tube. As another example, the control system 64 may adjust the voltage applied within the plasma tube (e.g., increase or decrease a frequency and/or amplitude of the voltage) to change a volatility of the electric arc(s) generated within the plasma tube. For instance, adjusting the voltage may change an appearance (e.g., a quantity of, an intensity, a stability, a flashing) of the electric arc(s) generated within the plasma tube. As a further example, the appearance of the electric arc(s) may be based on an atmospheric pressure within the plasma tube, and the control system 64 may adjust the atmospheric pressure to change appearance of the electric arc(s). Further still, the control system 64 may adjust an appearance of the light provided by the light strip, such as to adjust an intensity, a color, and/or an illuminated area associated with the light. Adjusting the appearance of the light may further adjust the appearance or perception of the electric arc(s) generated within the electric arc(s). The control system 64 may also adjust the appearance of the visual electrical effects in any other suitable manner to provide a particular experience via the show effects 54 to the guest(s) 53 within the vehicle 58 and/or the guest area 52. Light emitters (e.g., light emitting diodes) may be disposed in particular positions on the light strip to allow for particular patterns of operation (e.g., a pattern of light emission that appears to be electrical branching like natural lighting). In some embodiments, the light emitters on a light strip may define a grid that allows for selective operation (light emission) to provide animations.

Figure 2:
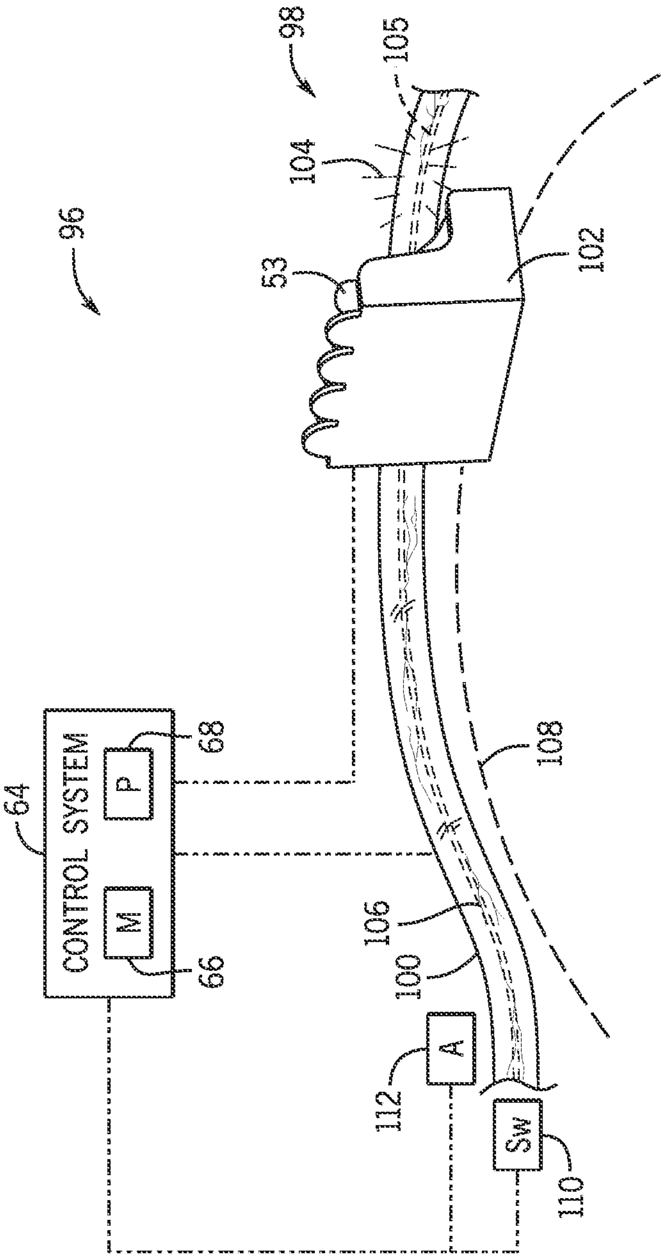
FIG. 2 is a perspective view of an embodiment of a show effect system of an attraction system, in accordance with an aspect of the present disclosure.

FIG. 2 is a perspective view of an embodiment of an attraction system 96 (e.g., the attraction system 50 of FIG. 1) that includes a show effect system 98 having a plasma tube 100 (e.g., a series of connected tube segments that operate individually), a light output 104 provided by a light source 105 (e.g., a light strip), and one or more electric arc(s) 106 generated within the plasma tube 100. In an embodiment, the plasma tube 100 may contain a gas (e.g., a noble gas), and the electric arc(s) 106 may be generated when a high voltage may be applied within the plasma tube 100. Furthermore, the plasma tube 100 may have an atmospheric pressure to facilitate generation of the electric arc(s) 106 (e.g., a low atmospheric pressure to reduce a threshold amount of voltage to generate the electric arc(s) 106). The plasma tube 100 may be formed from a particular material, such as glass or acrylic, configured to withstand the heat created by generating the electric arc(s) 106.

The attraction system 96 may also include a vehicle 102 (e.g., the vehicle 56 of FIG. 1) that may be oriented with respect to the show effect system 98 to enable the guest(s) 53 in the vehicle 102 to view the electric arc(s) 106. In an embodiment, the vehicle 102 may be proximate at least a portion of the plasma tube 100. For example, the attraction system 96 may include a track or path 108 that extends proximate the plasma tube 100 (e.g., at a first side of the plasma tube 100), and the control system 64, which may be a part of and/or communicatively coupled to the show effect system 98, may instruct the vehicle 102 to move along the track 108 (e.g., along the first side of the plasma tube 100) and proximate to the plasma tube 100.

Additionally, the show effect system 98 may include a light strip as the light source 105, wherein the light strip is configured to provide the light output 104. The light output 104 may enhance an appearance of the electric arc(s) 106. That is, the light output 104 may be transmitted through the plasma tube 100 and backlight the electric arc(s) 106 by illuminating a portion of the electric arc(s) 106. By way of example, the light output 104 may create the perception of increased intensity of the electric arc(s) 106, increased visibility of the electric arc(s) 106, and/or span across or overlap multiple electric arcs 106 to depict an increased electrical conduction created via the generated electric arc(s) 106. From the perception of the guest(s) 53 in the vehicle 102, the light output 104 may backlight or be transmitted from behind the electric arc(s) 106 to illuminate a portion of the electric arc(s) 106. To this end, the light strip (which is representative of any of various controlled light sources 105 that may be positioned proximate the plasma tube 105) may direct light into and through the plasma tube 100 to backlight or illuminate the electric arc(s) 106 via the light output 104. For example, the light strip may also extend along the plasma tube 100 (e.g., at a second side, opposite the first side, of the plasma tube 100). In one embodiment, the control system 64 may instruct the light strip to sequentially provide a light output 104 that appears to move along the plasma tube 100 to present an appearance of directionality and/or movement of the electric arc(s) 106 along the plasma tube 108. For example, the movement of the light output 104 along the plasma tube 108 may correspond to movement of the vehicle 102 along the track 108. That is, the perceived movement of light (e.g., generated by sequential activation/deactivation of light elements positioned along a line) may be along the same direction of travel as the vehicle 102 and/or track with the vehicle 102. To this end, the control system 64 may determine a position of the vehicle 102 relative to the plasma tube 100 (e.g., the vehicle 102 is proximate to a first section of the plasma tube 100) and cause the light strip to output light based on the position of the vehicle 102 relative to the plasma tube 100 (e.g., to cause the light strip to provide the light output 104 at the first section of the plasma tube 100 where the vehicle 102 is positioned). In an additional or alternative embodiment, another visual effect (e.g., a video) may be presented to the guest(s) 53, and the control system 64 may control the light output 104 provided by the light strip based on (e.g., in coordination with timing of) the other visual effect. For example, the control system 64 may cause the visualization of the light output 104 to correspond to the visualization of the other visual effect such that the visual electrical effect and the other visual effect provided by the show effect system 98 cooperatively provides a visual experience to the guest(s) 53.

The control system 64 may additionally or alternatively control a characteristic of the electric arc(s) 106 generated within the plasma tube 100. As an example, the plasma tube 100 may also include a switch 110 that coordinates with the plasma tube 100 to control certain operational characteristics. For example, the switch 110 may control a frequency and/or an amplitude of the voltage applied within the plasma tube 100 to adjust the electric arc(s) 106 generated within the plasma tube 100. For instance, the control system 64 may utilize the switch 110 to adjust an operating voltage to change a volatility of the electric arc(s) 106. In an example, reducing the frequency and/or the amplitude of the voltage may reduce the volatility of the electric arc(s) 106, such as by reducing a quantity of electric arc(s) 106 generated, forming an electric arc 106 having a more stable, a smoother, a more level, and/or a more continuous geometry, and/or reducing a frequency in which an electric arc 106 is generated. In another example, increasing the frequency and/or the amplitude of the voltage may increase the volatility of the electric arc(s) 106, such as by increasing the quantity of electric arc(s) 106 generated, forming an electric arc 106 having a more irregular or uneven (e.g., a zigzag shape, multiple electric arcs branching off one another) geometry, and/or increasing the frequency in which an electric arc 106 is generated.

The control system 64 may further be configured to adjust the atmospheric pressure within the plasma tube 100. For example, the plasma tube 100 may include an actuator 112 communicatively coupled to the control system 64 and configured to increase or decrease the pressure within the plasma tube 100. By way of example, the actuator 112 may be configured to activate a pump that directs fluid (e.g., air, gas mixture) into and/or out of the plasma tube 100. The control system 64 may instruct the actuator 112 to direct fluid into the plasma tube 100 to increase the pressure within the plasma tube 100, and the control system 64 may instruct the actuator 112 to direct fluid out of the plasma tube 100 to reduce the pressure within the plasma tube 100. Additionally or alternatively, the actuator 112 may include or be configured to adjust any other suitable component, such as a valve, to adjust the pressure within the plasma tube 100.

In one embodiment, the control system 64 may be configured to operate the switch 110 and the actuator 112 in conjunction with one another. That is, the control system 64 may be configured to instruct the switch 110 to apply a particular voltage based on the atmospheric pressure within the plasma tube 100, and/or the control system 64 may be configured to instruct the actuator 112 to adjust the pressure within the plasma tube 100 based on the voltage applied by the switch 110. In a specific example, the control system 64 may instruct the actuator 112 to adjust the atmospheric pressure within the plasma tube 100 to ½ atmospheres (atm) and instruct the switch 110 to apply a voltage having 20,000 volts in amplitude to generate an electric arc 106 based on the ½ atm within the plasma tube 100. In another example, the control system 64 may instruct the actuator 112 to adjust the atmospheric pressure within the plasma tube 100 to ⅛ atm and instruct the switch 110 to apply a voltage having 10,000 volts in amplitude to generate an electric arc 106 based on the ⅛ atm within the plasma tube 100. Indeed, the control system 64 may instruct the switch 110 to apply a voltage having an amplitude that changes linearly or non-linearly based on the atmospheric pressure within the plasma tube 100.

In an embodiment, the electric arc(s) 106 generated via the show effect system 98 may have a blue, white, and/or silver color. Additionally, the plasma tube 100 may be coated with a gel, a paint, or any suitable material that may adjust the visualized color of the electric arc(s) 106 by the guest(s) 53. For example, the coating of the plasma tube 100 may further enhance the color of the electric arc(s) and/or change the color of the electric arc(s) 106 (e.g., to a color that is not blue, white, or silver). Indeed, in an embodiment, the coating of the plasma tube 100 may be dynamically adjusted (e.g., via the control system 64) to change the color of the electric arc(s) 106 visible by the guest(s) 53 while the vehicle 102 moves along the plasma tube 100. The color of the light output 104 may also include any suitable color, such as a color that matches that of the electric arc(s) 106. Indeed, the control system 64 may operate the light strip to adjust the color of the light output 104 provided by the light strip. In some embodiments, a front side (the side facing viewing guests) of the plasma tube 100 may be transparent or tinted and the back side of the plasma tube 100 may be translucent (e.g., frosted) so that the light source 105 (e.g., light strip) is not visible to the viewing guests through the plasma tube 100. That is, the light source 105 may be positioned behind the translucent portion (e.g., coated side) to camouflage it.

Figure 3:
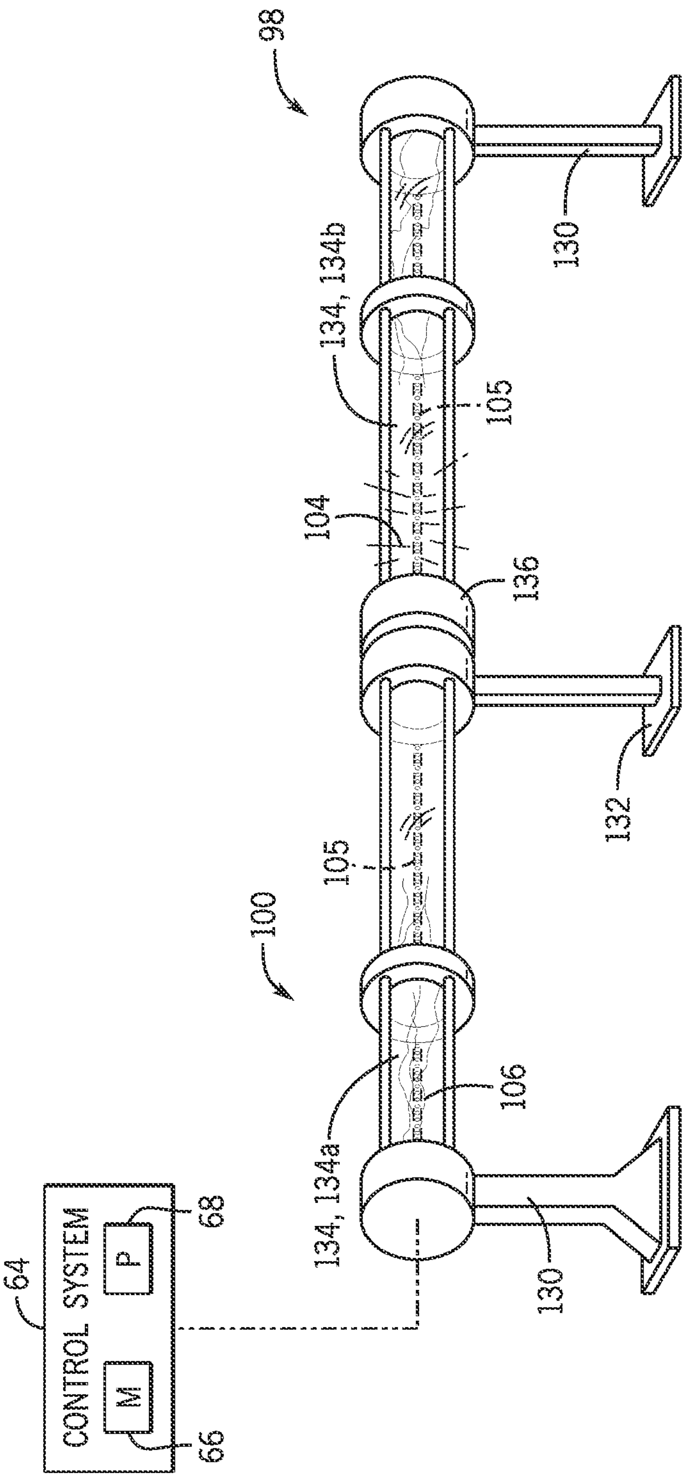
FIG. 3 is a perspective view of an embodiment of a show effect system of an attraction system, in accordance with an aspect of the present disclosure.

FIG. 3 is a perspective view of an embodiment of the show effect system 98. The illustrated show effect system 98 includes a plasma tube 100, the light source 105, a support system 130, multiple electrical arcs 106 extending within each of the plasma tubes 100, and the light output 104. The support system 130 may be configured to couple to the plasma tube 100 and position the plasma tube 100 in a desirable manner. As an example, the support system 130 may include an abutment that may be secured to a base 132 (e.g., a floor) and coupled to the plasma tube 100. The abutment may be configured to support a weight of the plasma tube 100 and restrict movement of the plasma tube 100 relative to the base 132. In an additional or alternative embodiment, the support system 130 may include another suitable component or feature, such as a mount, a fastener, a hook, an adhesive, a weld, and the like, configured to secure to the plasma tube 100 and position the plasma tube 100 within the attraction system. For instance, the support system 130 may restrict movement of the plasma tube 100 relative to another component of the attraction system, such as a wall (e.g., a side wall), a ceiling, and/or a track. The support system 130 may be obscured or hidden from view by the guests (e.g., via another prop or show effect of the attraction system) to present the plasma tube 100 in a more realistic manner with respect to theming of the attraction.

In one embodiment, the plasma tube 100 may include a first plasma tube section **134*a* and a second plasma tube section 134*b* that may be separate components configured to couple to one another. Each of the plasma tube sections 134*a*, 134*b* may include a respective internal volume, and the plasma tube sections 134 may be coupled such that the internal volumes form an overall enclosed volume extending through the plasma tube sections 134. The electric arc(s) 106 may be generated within the overall enclosed volume. That is, the electric arc(s) 106 may extend through each of the plasma tube sections 134 during operation of the show effect system 98. A coupler 136 (e.g., a sleeve, a fastener) may be used to couple the first plasma tube section 134*a* and the second plasma tube section 134*b* to one another, such as by attaching to respective ends of the plasma tube sections 134. In an embodiment, the coupler 136 may not affect visualization of the electric arc(s) 106 and/or the light output 104. As an example, the coupler 136 may be formed from a transparent or translucent material that may not alter an appearance of the electric arc(s) 106 and/or the light output 104 through the plasma tube 100. As another example, the coupler 136 may be hidden by one or more components of the attraction system, such as other show effects and/or props. Although the illustrated embodiment includes two plasma tube sections 134, an additional or alternative embodiment may include any suitable number of plasma tube sections 134, such as more than two plasma tube sections 134 that are coupled to one another. A further embodiment of the plasma tube 100 may include a single plasma tube section having a continuous enclosed volume in which the electric arc(s) 106** may be generated.

Figure 4:
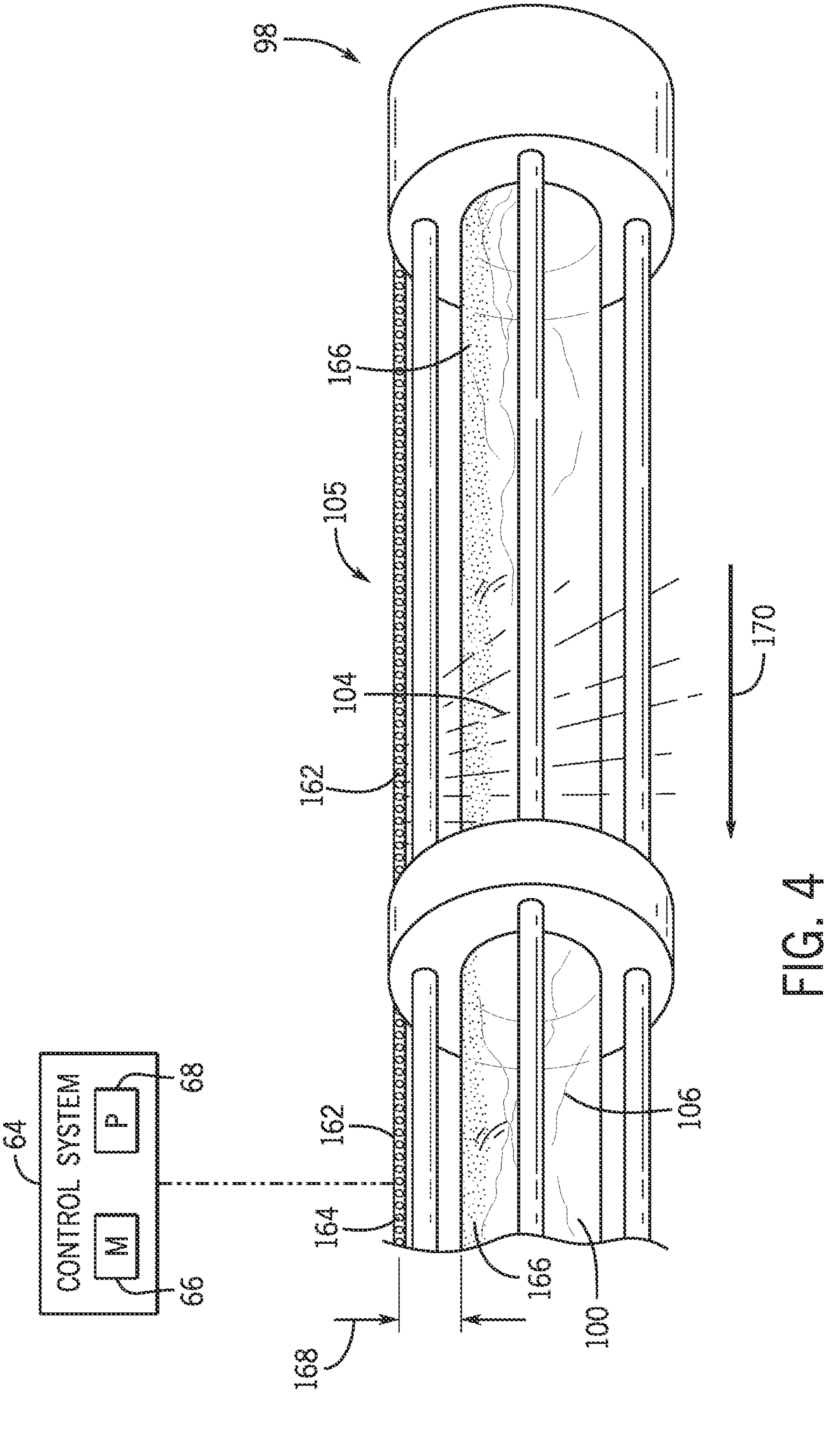
FIG. 4 is a close up view of an embodiment of a show effect system of an attraction system, in accordance with an aspect of the present disclosure.

FIG. 4 is a close up view of an embodiment of the show effect system 98. The illustrated show effect system 98 includes the plasma tube 100, the electric arc(s) 106 generated within the plasma tube 100, the light output 104, and the light source 105 (e.g., a light strip). The light source 105 may include a base 162 and light emitters 164 (e.g., LEDs, CFLs, incandescent light bulbs) coupled to the base 162. The base 162 may be disposed proximate to the plasma tube 100 to position the light emitters 164 along the plasma tube 100. In one embodiment, the light source 105 may be mounted or attached to the plasma tube 100 (e.g., via the base 162). Each light emitter 164 may be configured to output light into and through the plasma tube 100 in order to illuminate or backlight the electric arc(s) 106 within the plasma tube 100. For example, the light emitters 164 may include bulbs or any suitable component configured to output light into the plasma tube 100.

The plasma tube 100 may include a frosted portion 166, which may increase opacity of the plasma tube 100. In an embodiment, an additional component (e.g., a separate component having a frosted portion) may be coupled to the plasma tube 100 to implement the frosted portion 166. In an additional or alternative embodiment, the plasma tube 100 may be chemically or mechanically modified to include the frosted portion 166. That is, the frosted portion 166 may be integral to the plasma tube 100. In an example, paint, gel, or film may be applied to the plasma tube 100 (e.g., a side of the plasma tube 100 opposite to where the vehicle or guests are positioned). In another example, the plasma tube 100 may be sandblasted to create a pitted surface on the plasma tube and form the frosted portion 166 onto the plasma tube 100. In a further example, the plasma tube 100 may be acid-etched to form the frosted portion 166. The light source 105 may be arranged to orient the light emitters 164 to face the frosted portion 162 of the plasma tube 100, thereby enabling the light emitters 164 to direct light into the plasma tube 100 via the frosted portion 166 of the plasma tube 100. In this manner, the light emitters 164 may transmit light onto and through the frosted portion 166 to direct the light into the plasma tube 100 and onto the electric arc(s) 106. The frosted portion 166 may reduce a transparency or translucency (e.g., increase an opacity) of the plasma tube 100 to scatter the light output 104 from the light source 105 in order to produce a softened appearance of the light output 104 to illuminate the electric arc(s) 106. For example, the frosted portion 166 may blur an appearance of the light output 104 to distribute an intensity of the light throughout a part of the plasma tube 100 and avoid concentrating the light within a limited or focal area of the plasma tube 100.

The light source 105 may be positioned to offset the light emitters 164 at a distance 168 from the plasma tube 100, such as to form a gap or space between the light emitters 164 and the plasma tube 100. The offset between the light emitters 164 and the plasma tube 100 may block operation of the light source 105 and the plasma tube 100 from affecting one another. For example, the electric arc(s) 106 generated within the plasma tube 100 and/or the light projected by the light emitters 164 have respective electromagnetic fields. Substantial overlap of the electromagnetic fields may distort an appearance of the light output 104 provided by the light source 105 and/or affect generation of the electric arc(s) 106. For example, the electromagnetic field associated with the light source 105 may cause the electric arc(s) 106 to bias toward the light source 105. Positioning the light source 105 at a particular distance 168 above a low threshold distance value (e.g., greater than 10 centimeters or 4 inches, greater than 12 centimeters or 5 inches) may block operation of the plasma tube 100 and the light source 105 from affecting one another (e.g., from distorting appearances of the light output 104 and/or the electric arc(s) 106).

In another embodiment, the light source 105 may be positioned farther behind or greater than the low threshold distance value away from plasma tube 100. The distance 168 may depend on a size of the plasma tube 100. That is, increasing a radius of the plasma tube 100 may exponentially increase the electromagnetic field. As such, a plasma tube 100 with a large radius may generate electric arc(s) 106 that create a larger electromagnetic field. Thus, the distance 168 may be greater for plasma tubes 100 having a larger radius to reduce the overlap between the respective electromagnetic fields associated with the electric arc(s) 106 and the light output 104. For example, the light source 105 may be offset 10 centimeters or 4 inches from the plasma tube 100 having a radius of 7.5 centimeters or 3 inches. In another example, the light source 105 may be offset 5 centimeters or 2 inches from the plasma tube 100 having a radius of 1.25 centimeters or 0.5 inches. Additionally or alternatively, a shield may be implemented to reduce effects of electromagnetic fields. The shield may be made from glass, polyethylene terephthalate (PET), polycarbonate, acetate, or any other suitable material, and the shield may be transparent to avoid affecting an appearance of the light output 104 and/or the electric arc(s) 106. The shield may also block other elements, such as environmental features and/or other show effects, from affecting an appearance of the light output 104 and/or the electric arc(s) 106 and further maintain the visual electrical effect produced by the show effect system 98.

It should also be noted that the distance 168 may be less than a high threshold distance value to avoid directing light around the plasma tube 100 that should be directed through the plasma tube 100. Indeed, a higher distance 168 may increase a beam spread, distribution, or area of the light output 104 projected from the light emitters 164. At the high threshold distance value (e.g., 20 centimeters or 8 inches for a plasma tube 100 with a radius of 7.5 centimeters or 3 inches), a size of the beam spread may be greater than a dimension, such as a diameter, of the plasma tube 100 such that the light output 104 may be visible from around the plasma tube 100. Thus, the distance 168 may be less than the high threshold distance value to limit the size of the beam spread (e.g., within the dimension of the plasma tube 100) to reduce visibility of the light output 104 from around the plasma tube 100. In other words, the light source 105 may be positioned within the high threshold distance value to focus the light output 104 within the dimensions of the plasma tube 100 and block transmission of the light output 104 around the plasma tube 100. Additionally or alternatively, a separate feature or component may be incorporated to block the light output 104 from being directed around the plasma tube 100. As an example, the light emitters 164 may include a trim (e.g., a baffle trim, a reflector trim) or may be positioned within a recess to reduce the beam spread of the projected light output 104, such as by reducing a beam angle associated with the light emitters 164. As another example, panels or plates, which may deflect and/or absorb light, may be implemented (e.g., coupled to the base 162, coupled to the plasma tube 100) to block movement of the light output 104 around the plasma tube 100, thereby blocking visibility of the light output 104 from around the plasma tube 100. Focusing the light output 104 within the plasma tube 100 and blocking visibility of the light output 104 from around the plasma tube 100 may provide the realistic appearance that the light output 104 is being produced via the electric arc(s) 106 rather than the light source 105 or another external light emitter.

The control system 64 may be communicatively coupled to the light source 105 and may be configured to operate the light source 105 to portray the light output 104 as traveling along the plasma tube 100. To this end, the control system 64 may instruct the light emitters 164 to output light sequentially along the light source 105. For example, the control system 64 may instruct a subset of light emitters 164 to output light, instruct the subset of light emitters 164 to suspend output of the light, and instruct an adjacent subset of the light emitters 164 to output light after instructing the subset of light emitters 164 to suspend output of the light. Such operation may cause the light output 104 to appear to move in a direction 170 to illuminate or backlight different portions or lengths of the electric arc(s) 106 within the plasma tube 100. In an embodiment, the control system 64 may be configured to receive a video file and may instruct the light emitters 164 to output light based on the video file. For example, each light emitter 164 may be mapped to a particular pixel (e.g., a pixel at a particular location within a frame of the video file), and the control system 64 may instruct the light emitter 164 to output light based on a color of the corresponding pixels within the video file. As an example, the video file may depict movement of a white colored light in a particular direction in which a white colorization of a pixel may represent emission of the white colored light at the pixel. Thus, a different set of pixels may have the white colorization for various frames of the video file to portray movement of the white colored light. The control system 64 may cause one of the light emitters 164 to output light in response to its corresponding pixel having the white colorization for a particular frame of the video file. The control system 64 may also cause the light emitters 164 to block output of light in response to determining that its corresponding pixel does not have the white colorization for another particular frame of the video file. Thus, the control system 64 may adjust emission of light via the light emitters 164 for different frames of the video file. As such, the control system 64 may instruct the light emitters 164 to output light that matches the movement of the white light in the particular direction portrayed in the video file. In an additional or alternative embodiment, the control system 64 may instruct the light emitters 164 to flash or flicker light to change an appearance of the electric arc(s) 106 and/or the light output 104, such as to portray a spark, a glow, and so forth.

Figure 5:
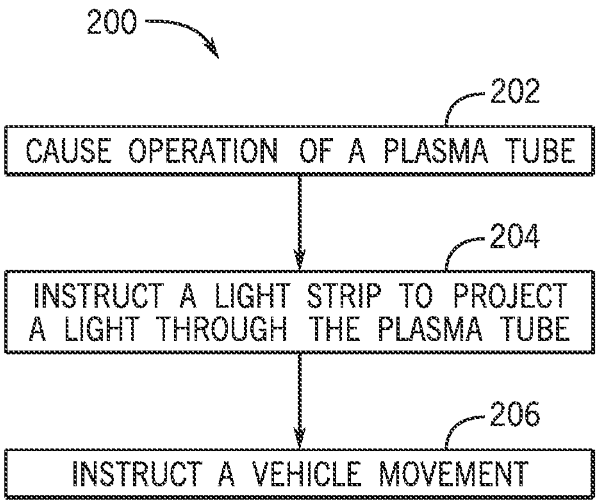
FIG. 5 is a flowchart of an embodiment of a method for operating a show effect system of an attraction system, in accordance with an aspect of the present disclosure.

FIG. 5 is a flowchart of an embodiment of a method or process 200 for operating a show effect system for an attraction system. Any suitable device (e.g., the processing circuitry 68 of the control system 64 illustrated in FIGS. 1-4) may perform the method 200. In one embodiment, the method 200 may be implemented by executing instructions stored in a tangible, non-transitory, computer-readable medium (e.g., the memory 66 of the control system 64). For example, the method 200 may be performed at least in part by one or more software components, one or more software applications, and the like. While the method 200 is described using steps in a specific sequence, additional steps may be performed, the described steps may be performed in different sequences than the sequence illustrated, and/or certain described steps may be skipped or not performed altogether.

At block 202, the control system may cause operation of a plasma tube (e.g., plasma tube 100). In an example, the control system may instruct a switch (e.g., the switch 110) to apply a voltage within the plasma tube. In another example, the control system may instruct an actuator (e.g., the actuator 112) to adjust an atmospheric pressure within the plasma tube. The atmospheric pressure within the plasma tube may affect a threshold amount of voltage to be applied to generate an electric arc. Thus, the control system may instruct the switch to apply the voltage and instruct the actuator to adjust the atmospheric pressure in conjunction with one another. In an embodiment, the control system may receive an indication (e.g., a user input, sensor data) to operate the show effect system and generate an electric arc based on the indication. For example, the indication may be associated with generation of an electric arc having a particular appearance or characteristic, such as an electric arc having a smooth profile. In response, the control system may instruct the switch to apply a voltage having a frequency below a threshold frequency value and/or an amplitude below a threshold voltage value and/or to instruct the actuator to increase the atmospheric pressure within the plasma tube to exceed a threshold atmospheric pressure value in order to generate the electric arc having the smooth profile. As an example, the control system may receive the indication via a user input, such as during testing and/or calibration of the show effect system. As another example, the control system may receive the indication via pre-programming and may automatically cause operation of the plasma tube (e.g., without a user input) based on the pre-programming.

At block 204, the control system may instruct a light strip or source (e.g., the light source 105) or other light source to project a light through the plasma tube. By way of example, the light strip may include light emitters (e.g., bulbs), and the control system may independently control each light emitter to output light. In an embodiment, the control system may receive an input and may cause the light strip to project the light through the plasma tube in response to receipt of the input. For instance, the input may include a video file having multiple frames, the control system may pixel map each light emitter (e.g., a bulb) to a particular pixel within the video file, and the control system may cause the light emitters to output light or block the light emitters from outputting light based on the colorization of the pixel in a frame of the video file. In one embodiment, the control system may instruct the light emitters to output light sequentially along the plasma tube to portray movement of light along the plasma tube. The cooperative operation of the plasma tube and the light strip may produce a visual electrical effect that modifies an appearance of the electric arc generated within the plasma tube.

At block 206, the control system may instruct movement of a vehicle (e.g., the vehicle 58, 102), such as along a track or path. In an embodiment, the control system may instruct movement of the vehicle based on the light projected via the light strip. The control system may include separate controllers (e.g., programmable logic controllers) for the vehicle and the light strip but the controllers may communicate with each other or a central controller to coordinate. By way of example, the control system may determine a first location associated with the light output via the light strip, the control system may determine a second location (e.g., a target location) of the vehicle based on or corresponding to the first location associated with the light, and the control system may instruct the vehicle to move to the second location. For instance, the control system may cause the vehicle to move along with or in parallel to the portrayed movement of light projected via the light strip (e.g., to synchronize movement of the vehicle and the portrayed movement of the projected light). Indeed, the control system may instruct the vehicle to move to enable a guest in the vehicle to view the electric arc generated within the plasma tube and the light projected via the light strip. Thus, the vehicle movement may be in conjunction with the visual electrical effect to provide the guest with an immersive ride experience via the visual electrical effect.

In another embodiment, the control system may instruct a light output via the light strip based on a movement of a vehicle (e.g., the vehicle 58, 102). That is, the control system may determine a location associated with the movement of the vehicle, and the control system may instruct the light strip to output light based on the location. For example, the control system may use data (e.g., pixel mapping instructions) that may associate each location of the vehicle with one or more light emitters for outputting light. Thus, based on a determined location of the vehicle (e.g., based on a visualization of the vehicle on the track or path), the control system may determine an associated light emitter (e.g., bulb) and instruct the light emitter to output light. As the vehicle moves along the track or path, the control system may determine an updated location of the vehicle, determine an updated light emitter associated with the updated location, and instruct the updated light emitter to output light (e.g., and suspend light from being output by a previous light emitter). Therefore, based on the movement of the vehicle along the track or path, the control system may cause the light strip to output light sequentially along the plasma tube, such as in parallel with the movement of the vehicle along the track or path. For example, the control system may cause the light output to move along with or in parallel to the movement of the vehicle along a track or path to provide the guests with an immersive ride experience via a visual electrical effect that appears to follow the vehicle.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A show effect system, comprising:

a plasma tube having an axial length greater than a width and configured to generate an electric arc within the plasma tube; and a light strip extending along the axial length of the plasma tube, wherein the light strip comprises a plurality of light emitters configured to output light through the plasma tube and backlight the electric arc generated by the plasma tube.

2. The show effect system of claim 1, wherein the plasma tube comprises a frosted portion configured to diffuse the light output by the light strip.

3. The show effect system of claim 2, wherein the plurality of light emitters of the light strip faces the frosted portion and is configured to output the light through the plasma tube via the frosted portion.

4. The show effect system of claim 1, comprising a controller communicatively coupled to the plasma tube, wherein the controller is configured to control operation of the plasma tube to generate the electric arc.

5. The show effect system of claim 4, wherein the plasma tube comprises a switch, and the controller is configured to operate the switch to control a frequency, an amplitude, or both of a voltage applied to the plasma tube to generate the electric arc.

6. The show effect system of claim 5, wherein the controller is configured to:

instruct the switch to increase the frequency, the amplitude, or both of the voltage applied to the plasma tube to increase a volatility of the electric arc generated by the plasma tube; and instruct the switch to reduce the frequency, the amplitude, or both of the voltage applied to the plasma tube to reduce the volatility of the electric arc generated by the plasma tube.

7. The show effect system of claim 1, comprising a controller communicatively coupled to the light strip, wherein the controller is configured to instruct the plurality of light emitters to output the light sequentially along the light strip.

8. The show effect system of claim 7, comprising a vehicle, wherein the controller is communicatively coupled to the vehicle, and the controller is configured to instruct the vehicle to move in coordination with the light output sequentially along the light strip.

9. An attraction system, comprising:

a plasma tube configured to generate an electric arc within the plasma tube;

a light strip extending along the plasma tube, wherein the light strip is configured to output light through the plasma tube and illuminate the electric arc generated by the plasma tube; and a vehicle configured to move along a path proximate to at least a portion of the plasma tube and the light strip.

10. The attraction system of claim 9, wherein the light strip is positioned at a first side of the plasma tube, and wherein the vehicle moves along a second side, opposite the first side, of the plasma tube.

11. The attraction system of claim 9, wherein the plasma tube comprises a coating or tinting configured to change a visualized color of the light output by the light strip through the plasma tube.

12. The attraction system of claim 9, wherein the light strip comprises a plurality of bulbs configured to output the light through the plasma tube, and wherein the light strip is positioned to offset the plurality of bulbs from the plasma tube.

13. The attraction system of claim 12, wherein the light strip comprises a base, the plurality of bulbs is coupled to the base, and the base is mounted to the plasma tube.

14. The attraction system of claim 9, comprising a controller communicatively coupled to the light strip, wherein the controller is configured to:

determine a location of the vehicle; and instruct the light output by the light strip based on the location of the vehicle.

15. The attraction system of claim 9, wherein the plasma tube comprises an actuator configured to adjust a pressure within the plasma tube, the attraction system comprises a controller communicatively coupled to the actuator, and the controller is configured to instruct the actuator to adjust the pressure within the plasma tube.

16. A show effect system, comprising:

a plasma tube having an axial length greater than a width, wherein the plasma tube comprises a switch configured to apply a voltage to generate an electric arc within an internal volume of the plasma tube;

a light strip external to the plasma tube and configured to output a light, wherein the light strip extends along the axial length of the plasma tube and is oriented to output the light through the plasma tube and onto the electric arc generated within the internal volume of the plasma tube; and a controller communicatively coupled to the plasma tube and the light strip, wherein the controller is configured to perform operations comprising:

instructing the switch to apply the voltage to generate the electric arc; and instructing the light strip to output the light.

17. The show effect system of claim 16, wherein the plasma tube comprises an actuator configured to adjust a pressure within the internal volume of the plasma tube, and the controller is configured to instruct the switch to apply the voltage having a frequency, an amplitude, or both based on the pressure.

18. The show effect system of claim 17, wherein the controller is communicatively coupled to the actuator, and the controller is configured to perform operations comprising:

instructing the actuator to adjust the pressure within the internal volume of the plasma tube to a first pressure;

instructing the switch to apply the voltage having a first amplitude based on the first pressure within the internal volume of the plasma tube;

instructing the actuator to adjust the pressure within the internal volume of the plasma tube to a second pressure below the first pressure; and instructing the switch to apply the voltage having a second amplitude based on the second pressure within the internal volume of the plasma tube, wherein the second amplitude is less than the first amplitude.

19. The show effect system of claim 16, wherein the light strip comprises a plurality of light emitters configured to output the light, and the controller is configured to perform operations comprising:

receiving a video file comprising a plurality of frames, and each frame of the plurality of frames comprises a plurality of pixels;

mapping a light emitter of the plurality of light emitters to a pixel of the plurality of pixels;

determining a respective color of each pixel of the plurality of pixels for each frame of the plurality of frames; and instructing the plurality of light emitters to output the light based on the respective colors of the plurality of pixels corresponding to the plurality of light emitters.

20. The show effect system of claim 16, wherein the plasma tube comprises a plurality of plasma tube sections and a coupler configured to couple the plurality of plasma tube sections to one another, and the internal volume of the plasma tube extends through the plurality of plasma tube sections.

21. The show effect system of claim 16, comprising a vehicle, wherein the controller is communicatively coupled to the vehicle, and the controller is configured to instruct the light strip to output the light in coordination with movement of the vehicle.

* * * * *